(12) United States Patent
Pierson et al.

(10) Patent No.: US 9,065,339 B2
(45) Date of Patent: Jun. 23, 2015

(54) METHODS AND APPARATUS FOR VOLTAGE REGULATION WITH DYNAMIC TRANSIENT OPTIMIZATION

(75) Inventors: Richard Pierson, Newport Beach, CA (US); Jinghong Guo, Torrance, CA (US); Tim M. Ng, Monterey Park, CA (US); Benjamim Tang, Rancho Palos Verdes, CA (US); Amir Babazadeh, Irvine, CA (US); Scott Southwell, Seal Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 930 days.

(21) Appl. No.: 13/046,603

(22) Filed: Mar. 11, 2011

(65) Prior Publication Data

US 2012/0229104 A1 Sep. 13, 2012

(51) Int. Cl.
*H02M 1/32* (2007.01)
*G06F 1/32* (2006.01)
*H02M 1/00* (2007.01)

(52) U.S. Cl.
CPC ........ *H02M 1/32* (2013.01); *H02M 2001/0012* (2013.01); *H02M 2001/0016* (2013.01); *G06F 1/3234* (2013.01); *G06F 1/3296* (2013.01); *Y02B 60/1285* (2013.01)

(58) Field of Classification Search
CPC . H02M 1/32; H02M 1/44; H02M 2001/0012; H02M 2001/0016; G06F 1/3206; G06F 1/3234; G06F 1/3296
USPC .......... 323/241, 246, 272, 282, 283, 284, 285
See application file for complete search history.

(56) References Cited

U.S. PATENT DOCUMENTS

| 7,545,131 | B1 * | 6/2009 | Alexander ..................... 323/284 |
| 7,615,982 | B1 | 11/2009 | Guo |
| 8,063,805 | B1 * | 11/2011 | Eid ............................... 341/142 |
| 8,242,759 | B2 * | 8/2012 | Carroll et al. ................. 323/272 |
| 2005/0007083 | A1 * | 1/2005 | Yang et al. .................... 323/282 |
| 2005/0146311 | A1 * | 7/2005 | Kuo et al. ..................... 323/282 |
| 2006/0091869 | A1 * | 5/2006 | Zhang ............................ 323/282 |
| 2008/0079406 | A1 * | 4/2008 | Holmquist et al. ........... 323/283 |
| 2008/0157743 | A1 * | 7/2008 | Martin et al. ................. 323/284 |
| 2009/0237056 | A1 * | 9/2009 | Alexander ..................... 323/284 |
| 2009/0309561 | A1 * | 12/2009 | Chen et al. .................... 323/282 |

(Continued)

FOREIGN PATENT DOCUMENTS

DE 202010005711 U1 10/2010

OTHER PUBLICATIONS

Guide for preparation of patent drawings. Jun. 2002. Published by USPTO.*

*Primary Examiner* — Fred E Finch, III
(74) *Attorney, Agent, or Firm* — Murphy, Bilak & Homiller, PLLC

(57) ABSTRACT

Methods and apparatus of dynamic transient optimization in a voltage regulator according to various aspects of the present invention may comprise a transition detector configured to compare an output voltage error to an amplitude threshold. The voltage regulator may further comprise a frequency detector configured to measure the frequency of the amplitude threshold being exceeded and to compare the frequency to a frequency threshold and a response circuit configured to activate a response according to a comparison between the frequency threshold and the frequency of the amplitude threshold being exceeded.

35 Claims, 7 Drawing Sheets

(56) References Cited

U.S. PATENT DOCUMENTS

Figure 1:
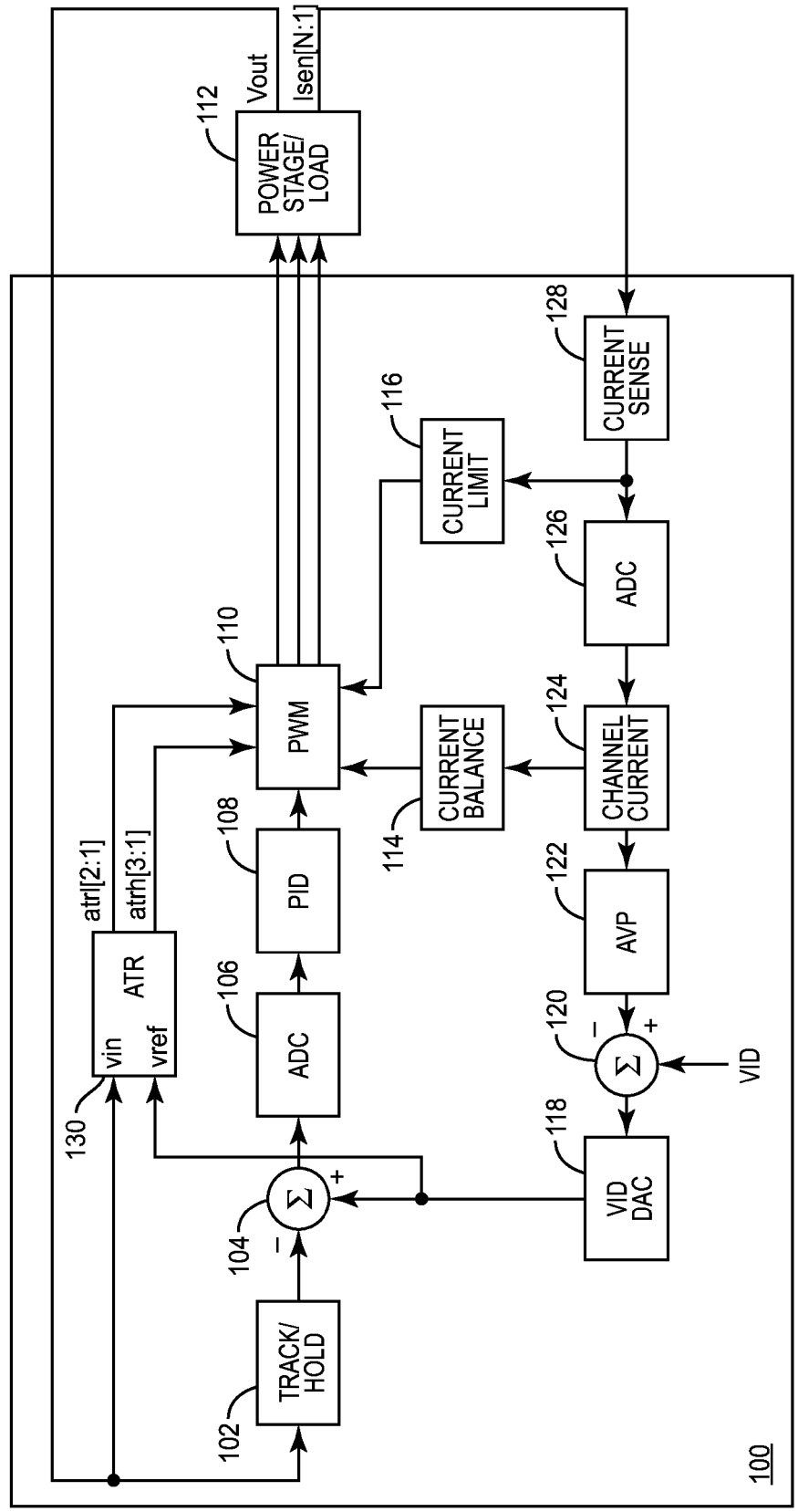

| | | | |
|---|---|---|---|
| 2010/0253307 A1* | 10/2010 | Chen et al. | 323/283 |
| 2011/0057637 A1* | 3/2011 | Liu | 323/287 |
| 2011/0148374 A1* | 6/2011 | Gizara | 323/282 |
| 2011/0241640 A1* | 10/2011 | Qiu et al. | 323/283 |
| 2011/0316495 A1* | 12/2011 | de Nie | 323/234 |
| 2012/0049824 A1* | 3/2012 | Chen et al. | 323/283 |
| 2012/0212193 A1* | 8/2012 | Sreenivas et al. | 323/234 |

* cited by examiner

METHODS AND APPARATUS FOR VOLTAGE REGULATION WITH DYNAMIC TRANSIENT OPTIMIZATION

BACKGROUND OF THE INVENTION

Regulated power supplies or voltage regulators are typically required to provide the voltage and current supply to microelectronic devices. The regulator is designed to deliver power from a primary source to an electrical load at the specified current, voltage, and power efficiency. Switching power converters (SPC), also referred to as buck regulators, are commonly used voltage regulators due to their high efficiency, high current capability, and topology flexibility. In addition, they can be designed to provide very precise voltage and current characteristics required by devices such as microprocessors, microcontrollers, memory devices, and the like.

Power requirements for emerging leading edge technology microprocessors have become very difficult to satisfy. As the speed and integration of microprocessors increases, the demands on the power regulation system increase. In particular, as gate counts increase, the power regulation current demand increases, the operating voltage decreases and transient events (e.g. relatively large voltage spikes or droops at the load) typically increase in both magnitude and frequency. Some emerging microprocessors are expected to run on less than 1.3 volts and more than 100 amperes.

SPCs utilizing step-down multi-phase buck converters have been the preferred topology to meet the low voltage and high current requirements of microprocessors. With the advent of increasingly complex power regulation topologies, digital techniques for power converter control, specifically in multiphase designs, can improve precision and reduce the system's total parts count while also supporting multiple applications in the same power system through digitally programmable feedback control.

Existing feedback controls take voltage and current measurements from the load, as well as from the individual output phases. The feedback information has been used to adjust the duty cycle, i.e., width of the pulses produced by each of the phases of a multi-phase buck regulator system, to bring the supplied voltage and current within the load line tolerances specified by the microprocessor manufacturer. Such multi-phase pulse width modulated (PWM) voltage regulator systems have been used in a variety of environments and applications.

Active Transient Response (ATR) has been used for high frequency response to rapidly changing power requirements at the load by quickly activating multiple phases to source or sink (as the case required) more current to or from the load, thereby temporarily overriding the generally slower overall voltage regulator system response. ATR enables voltage regulator systems to be designed with lower overall output capacitance while maintaining equivalent dynamic performance. An ATR circuit includes a window comparator that compares the output supply voltage at the load to the reference voltage, as determined by the specified load line. As long as the output voltage remains within a specified tolerance range (i.e., window) above or below the specified load line, the ATR circuit provides no input signal to the PWM, which proceeds to provide power to the load in a conventional manner. On the other hand, as soon as the voltage is outside the "window", the ATR circuit signals the PWM to modify its operation. For example, if the voltage drops below the specified voltage range, all low-side power switches in the multi-phase system are turned off and then, after a short delay, all high-side power switches are turned on, causing the normally staggered inductor charging to occur in parallel.

SUMMARY OF THE INVENTION

Methods and apparatus of dynamic transient optimization in a voltage regulator according to various aspects of the present invention may comprise a transition detector configured to compare an output voltage error to an amplitude threshold. The voltage regulator may further comprise a frequency detector configured to measure the frequency of the amplitude threshold being exceeded and to compare the frequency to a frequency threshold and a response circuit configured to activate a response according to a comparison between the frequency threshold and the frequency of the amplitude threshold being exceeded.

BRIEF DESCRIPTION OF THE DRAWING FIGURES

A more complete understanding of the present invention may be derived by referring to the detailed description and claims when considered in connection with the following illustrative figures. In the following figures, like reference numbers refer to similar elements and steps throughout the figures.

Figure 2:
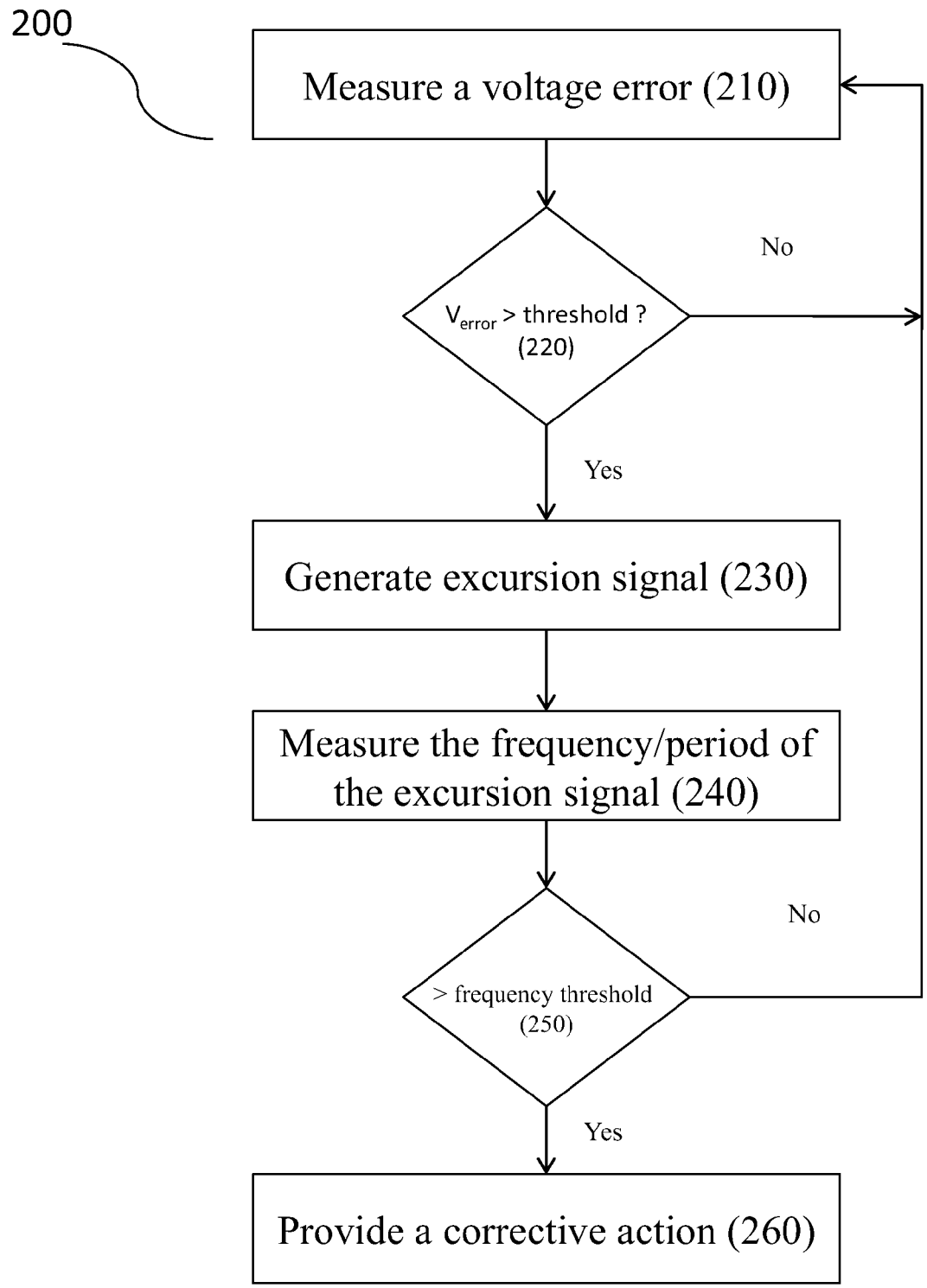
Figure 3:
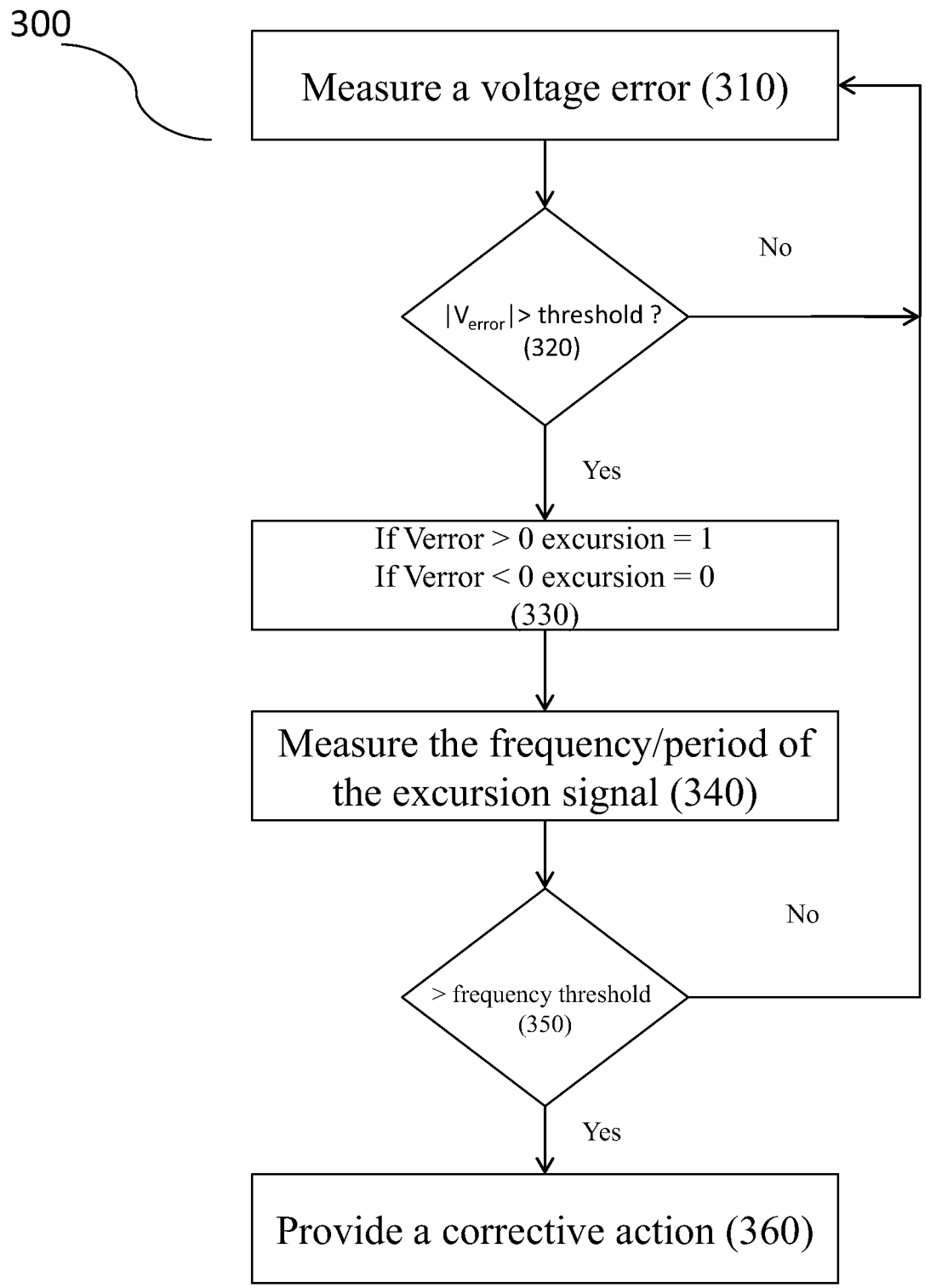
Figure 4:
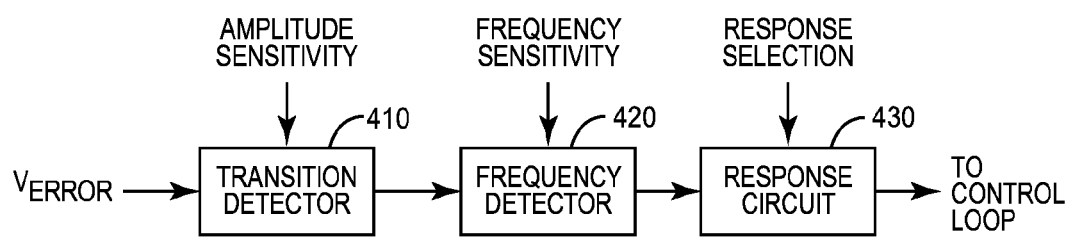
Figure 5:
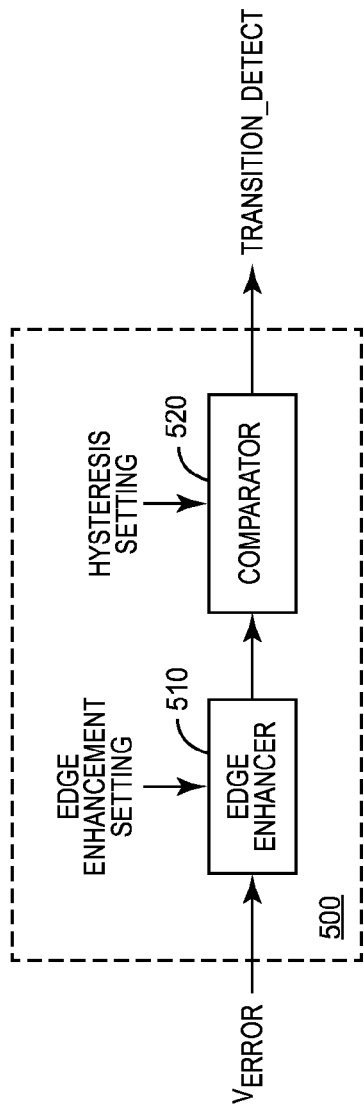
Figure 6:
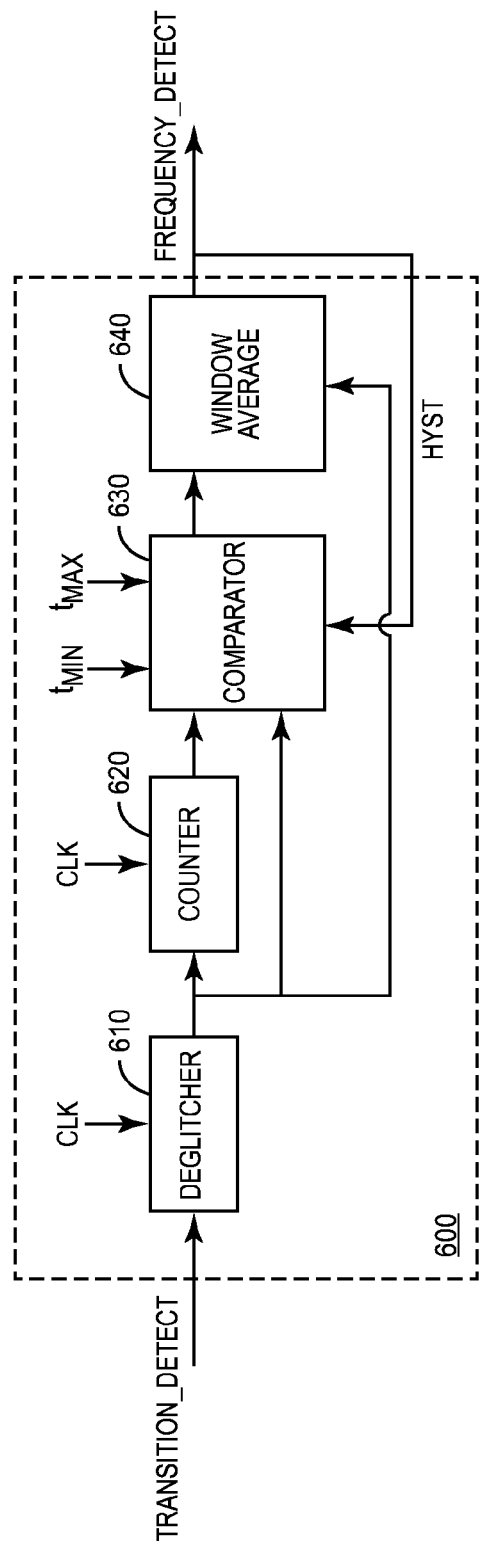
Figure 7:
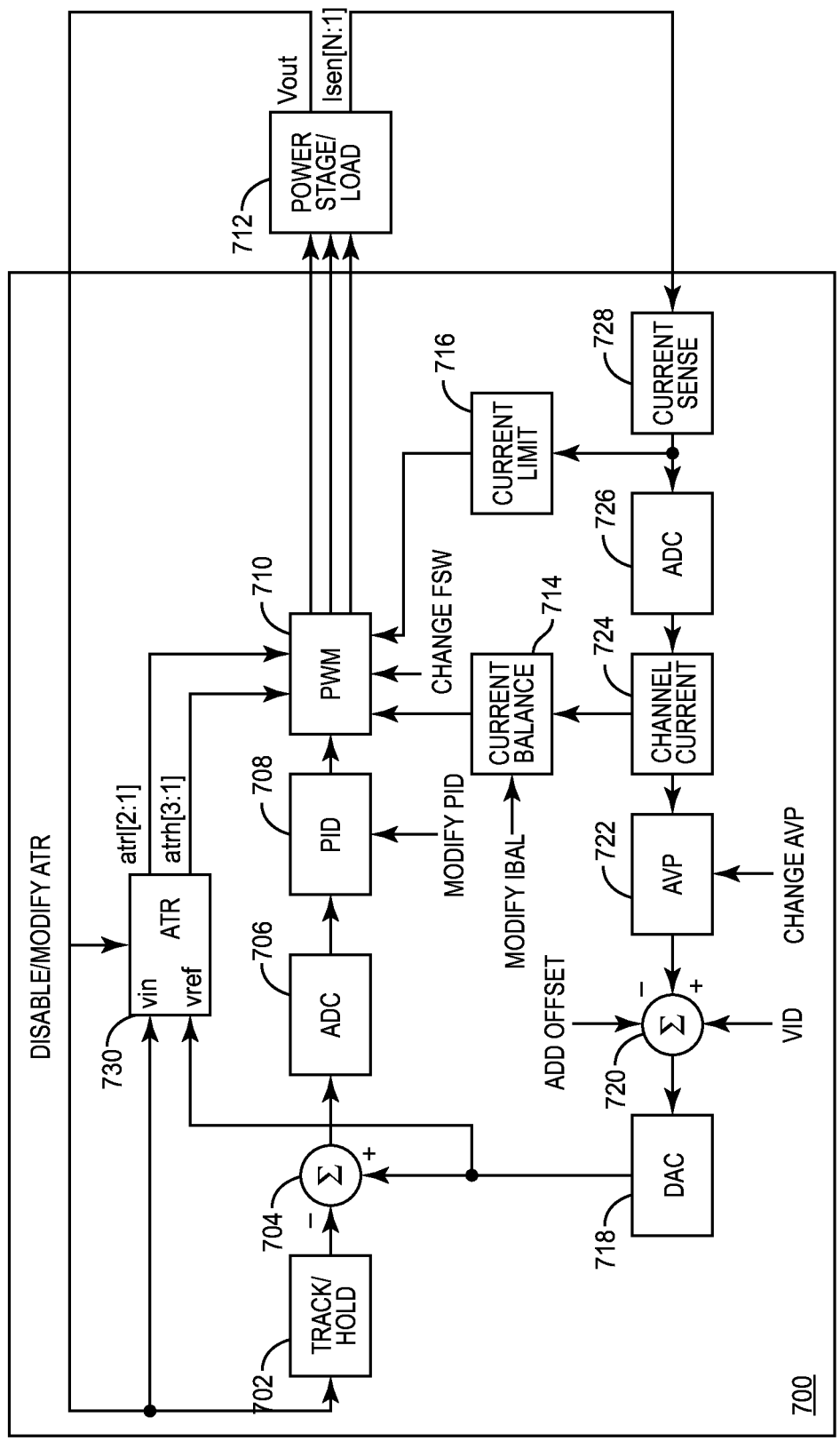
Figure 8:
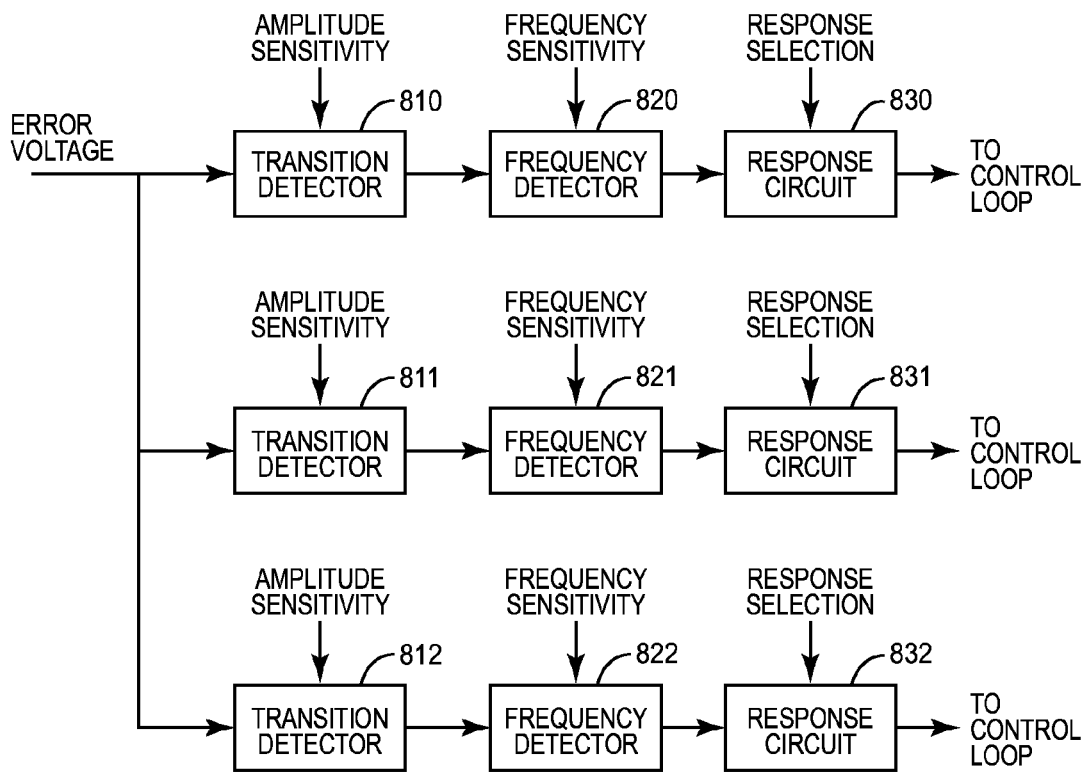

FIG. 1—A schematic of a voltage regulator.
FIG. 2—A block diagram displaying a method of dynamic transient optimization.
FIG. 3—A block diagram displaying another method of dynamic transient optimization.
FIG. 4—A schematic of a dynamic transient detection circuit.
FIG. 5—A schematic of a transition detector.
FIG. 6—A schematic of a frequency detector.
FIG. 7—A schematic of an embodiment of a voltage regulator with inputs for a dynamic transient detection circuit.
FIG. 8—A schematic of a multi-threshold multi-response dynamic transient detection circuit.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various integrated components and electronic devices that may be implemented in any appropriate manner, such as integrated circuits, logic arrays, processors, transistors, resistors, capacitors, inductors, and the like. In addition, the present invention may be practiced in conjunction with any number of converter and/or regulator applications, and the systems described are merely exemplary applications for the invention. Further, the present invention may employ any number of conventional techniques for regulating power, modifying a waveform, driving a voltage switch, controlling a driver, filtering a signal, and the like.

Various representative implementations of the present invention may be implemented in conjunction with a power supply. For example, referring to FIG. 1, a voltage regulator 100 may drive a power stage to supply a load (power stage and load collectively designated as element 112). The controller 100 drives the power stage with one or more control signals, such as PWM signals, to control the supply to the load. The controller 100 may receive feedback signals, such as an output voltage signal and an output current signal, representing the voltage and current supplied to the load. The controller 100 may adjust the voltage and current supplied to the load accordingly. The load may comprise a microelectronic component, such as a microprocessor, requiring very accurate power that is regulated and maintained during rapidly changing power requirements.

The controller 100 may be implemented in any suitable manner to control the power supplied to the load. For example, the controller 100 of the present exemplary embodiment comprises a track and hold circuit 102, a first summer 104, a voltage analog-to-digital converter (ADC) 106, a proportional-integral-derivative (PID) filter 108, and a PWM 110. The track and hold circuit 102 may sample the voltage of output voltage feedback signal and hold the value at a constant level for a particular duration. The first summer 104 sums the output of the track and hold circuit 102 and a target voltage to determine the magnitude of any voltage output error, which is converted to a digital signal by the voltage ADC 106. The converted digital signal is provided to the PID filter 108 to filter or compensate the signal, which is then provided to the PWM 110. The PWM 110 adjusts the duty cycle of the signals provided to one or more phases of the power stage to modulate the power delivered to the load.

The current feedback signal is delivered via the current sense 128, which senses the current delivered to the load and provides a corresponding signal. The sensed current signal may be digitized by the current ADC 126 and provided to the channel current 124. The channel current transmits the current signals for the various phases to the AVP circuit 122, which may adjust the reference voltage according to a predetermined load line, such as a load line provided by a manufacturer of the load. The second summer 120 sums the output of the AVP circuit 122 with a voltage identification code (VID), which may comprise a reference voltage specification provided by the processor or other load. For example, the VID may comprise a digital number provided by the microprocessor manufacturer describing specific power requirements, in particular the set point, i.e., initial load line voltage at minimum current. The VID DAC 118 converts the digital result to an analog voltage to provide the reference voltage for the controller 100.

The current balance 114 may balance the current among the enabled phases, and the peak pulse current limit 116 may limit the peak current delivered by any particular phase. The ATR circuit 130 provides rapid response to quickly changing power requirements at the load by activating multiple phases to supply or drain (as the case required) more current to or from the load. The various elements of the controller 100 may comprise conventional elements for performing the various functions, and any appropriate techniques and configurations may be utilized to implement one or more of the various functions.

In some cases, voltage transients at the output of the regulator due to changes in load current may occur at a very rapid rate. As the frequency of these voltage transients increases, it may become increasingly difficult for the voltage regulator to properly respond. The result is that the lag in response time between the voltage transients may cause the voltage regulator's response to exacerbate transients. In addition, voltage transients may quickly transition between positive voltage transients and negative voltage transients. This may particularly pose problems for the control loop to measure and correct because these transitions may occur at a frequency that not only provides an inadequate amount of time for the regulator to properly respond, but also requires a corrective action that may be very different than the one being provided. A high-frequency transition may result in the voltage regulator attempting to compensate for a negative voltage transient by providing more current when a positive transient is taking place, thus resulting in a more severe voltage transient.

Referring now to FIG. 2, a process for dynamic transient optimization 200 may comprise measuring a voltage error (210), generating an excursion signal when the voltage error exceeds an amplitude threshold (230), measuring a frequency of the excursion signal (240), and providing a corrective action if the frequency exceeds a frequency threshold (260). Measuring the voltage error $V_{error}$ may be performed in any suitable manner, such as by comparing the output voltage of the regulator and/or at the load to a reference voltage. In the present embodiment, the voltage error $V_{error}$ corresponds to the difference between the output voltage provided to the load and the reference voltage, such as the reference voltage provided to the first summer 104 via the VID DAC 118.

The voltage error $V_{error}$ may be compared to any suitable amplitude threshold (220). For example, the amplitude threshold may correspond to a threshold indicating an unusually high voltage error requiring corrective action, such as a threshold selected for active transient response. The amplitude threshold may be selected, however, according to any suitable criteria. If the voltage error $V_{error}$ does not exceed the amplitude threshold, the process continues to measure the voltage error $V_{error}$ (210). If the voltage error exceeds the amplitude threshold, an excursion signal is generated (230), indicating that the amplitude threshold has been exceeded.

In one embodiment, the excursion signal may comprise a signal that is indicative of the voltage error $V_{error}$. For example, referring to FIG. 3, the voltage error $V_{error}$ may be compared to the amplitude threshold (320). If the absolute value of the voltage error $V_{error}$ does not exceed the amplitude threshold, then the excursion signal is maintained at its current state. If the absolute value of the voltage error $V_{error}$ exceeds the amplitude threshold, then the excursion signal may be modified. If the voltage error $V_{error}$ is positive, then the excursion signal will be set to high. If the voltage error is negative, then the excursion signal will be set to low (330). The frequency or period of the excursion signal may be measured by measuring the time between changes in the excursion signal (340).

The frequency or period of the excursion signal may be measured (240), for example continuously, intermittently, or at regular intervals. If the frequency or period is less than the frequency threshold, within a selected bandwidth, or outside a selected bandwidth, then the system returns to measuring the voltage error (210). If the frequency or period is greater than the frequency threshold or otherwise meets the selected criteria, then the system provide a corrective action (260) to counteract the high-frequency transient.

Referring to FIG. 4, in one embodiment of the invention, a high-frequency transition detector 400 may provide a response action when a high-frequency transition is detected. The high-frequency transition detector 400 may comprise a transition detector 410, a frequency detector 420, and a response circuit 430. The high-frequency transition detector 400 may be provided the voltage error $V_{error}$ signal corresponding to the difference between the output voltage $V_{out}$ and the reference voltage $V_{ref}$. In one embodiment, the high-frequency transition detector 400 may output a corrective action signal if high-frequency transitions are detected.

In one embodiment, the transition detector 410 may compare the error voltage $V_{error}$ to a threshold. The threshold may comprise a transition threshold for a positive error voltage $V_{error}$ and a threshold for a negative error voltage $V_{error}$. In another embodiment, the transition threshold may comprise multiple thresholds in the same direction. For example, the threshold may comprise a first threshold for a positive error voltage $V_{error}$ and a second threshold of larger amplitude for a positive error voltage $V_{error}$. Likewise, the threshold may comprise multiple negative error voltage $V_{error}$ thresholds. The amplitude threshold may also comprise a programmable threshold that may be modified depending on an application.

Referring now to FIG. 5, an exemplary transition detector 500 may comprise an edge enhancer 510 and comparator 520. In one embodiment, the edge enhancer 510 may be configured to help identify a voltage error $V_{error}$ with a small amplitude. In one embodiment, the edge enhancer 510 may compute a weighted voltage error $W_{error}$ comprising a weighted sum of the error voltage $V_{error}$. The weighted sum may comprise the present voltage error $V_{error}(t)$ plus the weighted difference between the present voltage error $V_{error}(t)$ and the last voltage error $V_{error}(t-1)$ as shown by the following equation:

$$W_{error}=V_{error}(t)+w\cdot(V_{error}(t)-V_{error}(t-1))$$

The weight of the change in error w may comprise a programmable edge enhancement setting. The weight w may comprise any suitable weight. For example the weight may comprise w=[0, 0.25, 0.5, 0.75].

The comparator 520 may be configured to generate an excursion signal based on whether the weighted error exceeds the threshold. In one embodiment, the comparator 520 may comprise a hysteretic comparator. The hysteretic comparator may be configured to generate an excursion signal that changes based on a change in sign of the voltage error $V_{error}$. For example, if a first voltage error is a negative voltage error and it exceeds the threshold, then the excursion signal may be set to 0. If a second voltage error is also a negative voltage error that exceeds the threshold, the excursion signal may still output 0. If a third voltage error is a positive voltage error that exceeds the threshold, the excursion signal may be set to 1. Thus, the excursion signal only changes if there is a transition between a negative and a positive transient. Thus, for a positive load current transition, the excursion signal may change from a 0 to 1. Likewise, for a negative load current transition, the excursion signal may change from 1 to 0.

The hysteretic comparator 520 may also comprise a hysteresis setting input. The hysteresis setting input may be configured to receive a hysteresis setting that controls a hysteresis in the hysteretic comparator 520. The hysteresis setting may comprise a hysteresis threshold. The hysteresis threshold may be used to adjust the sensitivity of the hysteretic comparator 520.

Referring to FIGS. 4 and 6, an exemplary frequency detection circuit 420 may measure a frequency of the excursion signal generated by the transition detection circuit 410, compare the frequency to a frequency threshold, and output a high-frequency transient signal if the frequency threshold is exceeded. In another embodiment, the frequency detection circuit 420 may measure the frequency of the transition signal generated by the transition detection circuit 410. An exemplary frequency detection circuit 600 may comprise a deglitcher 610, a counter 620, a comparator 630, and a window average 640.

In one embodiment, the deglitcher 610 may be configured to receive the input from the transition detection circuit 410 and receive a clock input. The deglitcher 610 may be configured provide a filtered excursion signal to the counter 620. The deglitcher 610 may operate by removing a narrow pulse or other noise coming from the transition detection circuit 410 that is not indicative of an actual transition. In one embodiment, the deglitcher may be used to count the number of clock cycles between changes in the excursion signal and remove pulses that only last for a programmed number of clock cycles. In one embodiment, the deglitcher 610 may provide the filtered excursion signal to the comparator 630. In another embodiment, the deglitcher 610 may also provide the filtered excursion signal to the window average 640.

In one embodiment, the counter 620 receives the filtered output from the deglitcher 610. The counter 620 may generate any suitable count to determine the period of the excursion signal. In one embodiment, the counter 620 may be configured to generate a count comprising the number of clock cycles between changes in the excursion signal. In another embodiment, the counter 620 may be configured to count the clock cycles between receiving a leading edge in the excursion signal, thus measuring a time between a transition between a negative voltage error and a positive voltage error. A leading edge may comprise a change in the excursion signal between a low signal (0) and a high signal (1). In another embodiment, the counter 620 may be configured to count the clock cycles between receiving a falling edge in the excursion signal, thus measuring a time between a transition between a positive voltage error and a negative voltage error. In another embodiment, the counter may be configured to measure the frequency of the excursion signal.

In one embodiment, the comparator 630 may be configured to receive the count from the counter 620 and compare the count to a frequency threshold ($t_{min}$). In one embodiment, if the period is greater than a threshold, the comparator 630 may generate a frequency excursion signal. Likewise, in another embodiment, the comparator 630 may compare the frequency of the count to the frequency threshold. The frequency threshold may comprise one or more suitable thresholds, such as a frequency window comprising an upper frequency threshold and a lower frequency threshold. The upper and lower threshold may be selected according to any suitable criteria, such as according to frequencies or periods associated with ineffective or counterproductive responses by the regulator in ordinary operation. If the count is within the frequency window or otherwise meets selected criteria, the comparator 630 may generate a frequency excursion signal.

In one embodiment, the comparator 630 may also receive the filtered excursion signal from the deglitcher 610. The filtered excursion signal may be used in conjunction with the count from the counter 620. The comparator 630 may compare the count to the frequency threshold between changes in the filtered excursion signal.

In one embodiment the frequency threshold may comprise a first threshold to enter into a high-frequency transient window and a second threshold to leave the high-frequency transient window. In this embodiment, if the frequency of the excursion window exceeds the first threshold, the frequency excursion signal will be high. The frequency excursion signal will then remain high until the frequency of the excursion signal drops below the second threshold.

In one embodiment, the frequency threshold may comprise a threshold that is adjusted by a hysteresis setting. The hysteresis setting may be configured such that frequency excursion signal does not rapidly change when the frequency excursion signal is close to the frequency threshold.

In one embodiment, the comparator 630 may be coupled to the window average 640. A window average considers the aggregate of multiple results over a defined time span or number of results. The window average 640 may comprise a circuit configured to generate a high-frequency transient detection signal comprising the average frequency excursion signal over multiple frequency excursion signals. For example, the window average 640 may only output a high-frequency transient detection signal if it receives the same frequency excursion signal for a predetermined or programmable length of time or number of clock cycles.

In one embodiment, the window average 640 may be coupled to the deglitcher 610 and receive the filtered excursion signal in addition to the frequency excursion signal from the comparator 630. In this embodiment, the window average 640 may assert the high-frequency transient detection signal if it receives the same asserted frequency excursion signal for a predetermined or programmable number of excursion signals from the deglitcher 610. The window average 640 may deassert the high-frequency transient signal if it receives the same deasserted high-frequency excursion signal for a predetermined or programmable number of excursion signals from the deglitcher 610. The window average 640 may also deassert the high-frequency transient signal after a predetermined or programmable length of time or number of clock cycles.

The response circuit 430 may comprise a circuit configured to receive a high-frequency transient signal from the frequency detector 420. The response circuit may be any suitable circuit configured to implement a response. The response may comprise any suitable response for remedying a voltage transient. For example, the response may comprise disabling or modifying the output of a non-linear response circuit such that the effective gain of the feedback loop of voltage regulator is increased. In one embodiment, a non-linear response circuit may comprise the ATR circuit 130. The response may comprise modifying the effective output impedance, for example by modifying the AVP voltage level or operation. In one embodiment, the AVP bandwidth may be modified to modify the output impedance.

The response may also comprise modifying a control loop that affects a dynamic behavior of the voltage regulator. For example, affecting dynamic behavior may comprise modifying the current balance between a first phase and a second phase. The response may also comprise providing an output offset to counteract shift due to asymmetry in the voltage regulator's response. Further, the response may comprise modifying a switching frequency generated by the PWM 110 or modifying the operation of the PID 108.

For example, referring to FIG. 7, a voltage regulator may comprise additional capabilities for corrective action responses from the response circuit 430. In this embodiment, the voltage regulator comprises a controller 700 and a power stage and load 712. The controller 700 comprises a track and hold circuit 702, a first summer 704, a voltage adc 706, a PID filter 708, a PWM 710, a current balance 714, a peak pulse current limit 716, a current sense 728, a current adc 726, a channel current 724, an adaptive voltage positioning (AVP) circuit 722, a second summer 720, a VID DAC 718, and an active transient response (ATR) circuit 730. Additionally, the PID filter 708 further comprises a modify PID input, the PWM 710 further comprises a change switching frequency (Fsw) input, the current balance 714 further comprises a modify phase current balance (IBAL) input, the second summer 720 further comprises a voltage offset input (add offset), the AVP circuit 722 further comprises a change AVP input, and the ATR circuit 730 further comprises an input to disable or modify ATR input.

Different corrective actions may be enabled in response to different conditions. For example, certain conditions may require disabling the ATR circuit 730, while other condition may call for adding an offset to the reference voltage. Different responses with different corrective action may be enabled in response to detection of different conditions. For example, referring now to FIG. 8, multiple transition detectors 810, 811, 812 coupled to multiple frequency detectors 820, 821, 822 may be coupled to multiple response circuits 830, 831, 832. Each transition detector 810, 811, 812 may have different amplitude thresholds and each frequency detector may have different frequency thresholds. The various amplitude thresholds and frequency thresholds may be selected to activate various corrective actions.

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to an exemplary embodiment. However, changes and modifications may be made to the exemplary embodiment without departing from the scope of the present invention. These and other changes or modifications are intended to be included within the scope of the present invention.

What is claimed is:

1. A method of dynamic transient optimization in a voltage regulator, the method comprising:
    measuring a voltage error in the voltage regulator;
    setting an excursion signal at a first value when the voltage error exceeds a positive amplitude threshold and setting the excursion signal at a second value different than the first value when the voltage error exceeds a negative amplitude threshold, such that the excursion signal changes from the first value to the second value only when the voltage error changes from exceeding the positive amplitude threshold to exceeding the negative amplitude threshold and changes from the second value to the first value only when the voltage error changes from exceeding the negative threshold to exceeding the positive threshold, so as to define a window for which the excursion signal changes from one of the values to the other value so long as the voltage error changes from exceeding one of the amplitude thresholds to exceeding the other amplitude threshold;
    measuring a frequency of the excursion signal between changes in the excursion signal; and
    providing a corrective action if the frequency exceeds a frequency threshold,
    wherein one or both of the amplitude thresholds are programmable,
    wherein the frequency threshold is programmable.

2. A method of dynamic transient optimization in a voltage regulator as in claim 1, wherein providing the corrective action if the frequency exceeds a frequency threshold comprises providing the corrective action if the frequency is within a frequency window.

3. A method of dynamic transient optimization in a voltage regulator as in claim 1, wherein measuring the frequency of the excursion signal between changes in the excursion signal comprises:
    measuring a first frequency of the excursion signal when set to the first value; and
    measuring a second frequency of the excursion signal when set to the second value.

4. A method of dynamic transient optimization in a voltage regulator as in claim 3, wherein providing the corrective action if the frequency exceeds a frequency threshold comprises:
    providing a first corrective action if the first frequency exceeds a first frequency threshold; and
    providing a second corrective action if the second frequency exceeds a second frequency threshold.

5. A method of dynamic transient optimization in a voltage regulator as in claim 1, wherein providing the corrective action comprises disabling a non-linear response circuit.

6. A method of dynamic transient optimization in a voltage regulator as in claim 1, wherein providing the corrective action comprises decreasing a loop gain by changing a compensator gain response.

7. A method of dynamic transient optimization in a voltage regulator as in claim 1, wherein providing the corrective action comprises modifying an output impedance by changing an AVP (adaptive voltage positioning) droop.

8. A method of dynamic transient optimization in a voltage regulator as in claim 1, wherein providing the corrective action comprises modifying an output impedance by changing a loop bandwidth.

9. A method of dynamic transient optimization in a voltage regulator as in claim 1, wherein providing the corrective action comprises modifying a control loop to effect a dynamic behavior comprising modifying a current balance.

10. A method of dynamic transient optimization in a voltage regulator as in claim 1, wherein providing the corrective action comprises adding an output offset.

11. A method of dynamic transient optimization in a voltage regulator as in claim 1, further comprising detecting a plurality of different conditions associated with operation of the voltage regulator responsive to the voltage error, by detecting whether the voltage error exceeds voltage and frequency thresholds defined for each condition.

12. A method of dynamic transient optimization in a voltage regulator as in claim 11, wherein a plurality of transition detectors have independently programmable amplitude and frequency thresholds for detection of different conditions.

13. A method of dynamic transient optimization in a voltage regulator as in claim 11, further comprising enabling different corrective actions responsive to the detection of the different conditions.

14. A method of dynamic transient optimization in a voltage regulator comprising:
    providing a pulse width modulated signal to a power stage;
    providing current from the power stage;
    measuring an output voltage;
    calculating a voltage error, wherein calculating the voltage error comprises calculating the difference between the output voltage and a target voltage;
    adjusting the pulse width modulated signal according to the voltage error;
    setting an excursion signal at a first value when the voltage error exceeds a positive amplitude threshold and setting the excursion signal at a second value different than the first value when the voltage error exceeds a negative amplitude threshold, such that the excursion signal changes from the first value to the second value only when the voltage error changes from exceeding the positive amplitude threshold to exceeding the negative amplitude threshold and changes from the second value to the first value only when the voltage error changes from exceeding the negative threshold to exceeding the positive threshold, so as to define a window for which the excursion signal changes from one of the values to the other value so long as the voltage error changes from exceeding one of the amplitude thresholds to exceeding the other amplitude threshold;
    measuring a frequency of the excursion signal between changes in the excursion signal; and
    providing a corrective action if the frequency exceeds a frequency threshold,
    wherein one or both of the amplitude thresholds are programmable,
    wherein the frequency threshold is programmable.

15. A method of dynamic transient optimization in a voltage regulator as in claim 14, wherein providing the corrective action if the frequency exceeds a frequency threshold comprises providing the corrective action if the frequency is within a frequency window.

16. A method of dynamic transient optimization in a voltage regulator as in claim 14, wherein measuring the frequency of the excursion signal between changes in the excursion signal comprises:
    measuring a first frequency of the excursion signal when set to the first value; and
    measuring a second frequency of the excursion signal when set to the second value.

17. A method of dynamic transient optimization in a voltage regulator as in claim 16, wherein providing the corrective action if the frequency exceeds a frequency threshold comprises:

providing a first corrective action if the first frequency exceeds a first frequency threshold; and providing a second corrective action if the second frequency exceeds a second frequency threshold.

18. A method of dynamic transient optimization in a voltage regulator as in claim 14, wherein providing the corrective action comprises disabling a non-linear response circuit.

19. A method of dynamic transient optimization in a voltage regulator as in claim 14, wherein providing the corrective action comprises decreasing a loop gain by changing a compensator gain response.

20. A method of dynamic transient optimization in a voltage regulator as in claim 14, wherein providing the corrective action comprises modifying an output impedance by changing an AVP (adaptive voltage positioning) droop.

21. A method of dynamic transient optimization in a voltage regulator as in claim 14, wherein providing the corrective action comprises modifying an output impedance by changing a loop bandwidth.

22. A method of dynamic transient optimization in a voltage regulator as in claim 14, wherein providing the corrective action comprises modifying a control loop to effect a dynamic behavior comprising modifying a current balance.

23. A method of dynamic transient optimization in a voltage regulator as in claim 14, wherein providing the corrective action comprises adding an output offset.

24. A method of dynamic transient optimization in a voltage regulator as in claim 14, further comprising detecting a plurality of different conditions associated with operation of the voltage regulator responsive to the voltage error, by detecting whether the voltage error exceeds voltage and frequency thresholds defined for each condition.

25. A method of dynamic transient optimization in a voltage regulator as in claim 24, wherein a plurality of transition detectors have independently programmable amplitude and frequency thresholds for detection of different conditions.

26. A method of dynamic transient optimization in a voltage regulator as in claim 24, further comprising enabling different corrective actions responsive to the detection of the different conditions.

27. A dynamic transient optimization circuit comprising:
a transition detector configured to compare an output voltage error to a positive amplitude threshold and a negative amplitude threshold, and set an excursion signal at a first value when the output voltage error exceeds a positive amplitude threshold and set the excursion signal at a second value different than the first value when the output voltage error exceeds a negative amplitude threshold, such that the excursion signal changes from the first value to the second value only when the voltage error changes from exceeding the positive amplitude threshold to exceeding the negative amplitude threshold and changes from the second value to the first value only when the voltage error changes from exceeding the negative threshold to exceeding the positive threshold, so as to define a window for which the excursion signal changes from one of the values to the other value so long as the voltage error changes from exceeding one of the amplitude thresholds to exceeding the other amplitude threshold;

a frequency detector configured to measure a frequency of the excursion signal between changes in the excursion signal; and a response circuit configured to activate a response if the frequency of the excursion signal exceeds a frequency threshold, wherein one or both of the amplitude thresholds are programmable, wherein the frequency threshold is programmable.

28. A dynamic transient optimization circuit as in claim 27, wherein the transition detector comprises:
an edge enhancer configured to identify a small amplitude; and a comparator configured to compare the output voltage error to the positive and negative amplitude thresholds.

29. A dynamic transient optimization circuit as in claim 28, wherein the comparator comprises a hysteretic comparator configured to output a high excursion signal for a positive voltage error that exceeds the positive amplitude threshold and a low excursion signal for a negative voltage error that exceeds the negative amplitude threshold.

30. A dynamic transient optimization circuit as in claim 27, wherein the frequency detector comprises:
a counter coupled to the transition detector;

a comparator configured to compare a count generated by the counter to a minimum limit and a maximum limit; and a window average configured to compare the output of the comparator to a previous comparator output.

31. A dynamic transient optimization circuit as in claim 30, wherein the frequency detector further comprises a deglitcher configured to filter noise from the transition detector.

32. A dynamic transient optimization circuit as in claim 27, further comprising:
a pulse width modulator configured to provide a duty cycle according to a target voltage;

a power stage coupled to the pulse width modulator wherein the power stage generates an output voltage and wherein the output voltage error comprises the difference between the output voltage and a reference voltage.

33. A dynamic transient optimization circuit as in claim 27, further comprising a plurality of transition detectors configured to detect a plurality of different conditions associated with operation of the voltage regulator responsive to the voltage error, by detecting whether the voltage error exceeds voltage and frequency thresholds defined for each condition.

34. A dynamic transient optimization circuit as in claim 33, wherein the plurality of transition detectors have independently programmable amplitude and frequency thresholds for detection of different conditions.

35. A dynamic transient optimization circuit as in claim 33, further comprising a plurality of frequency detectors configured to enable different corrective actions responsive to the detection of the different conditions.

\* \* \* \* \*